United States Patent [19]
Salmon

[11] 4,092,719
[45] May 30, 1978

[54] AUTOADAPTIVE WORKING CENTER FOR PROGRAMMABLE AUTOMATION

[75] Inventor: Mario Salmon, Ivrea (Turin), Italy

[73] Assignee: Ing. C. Olivetti & C., S.p.A., Ivrea (Turin), Italy

[21] Appl. No.: 717,945

[22] Filed: Aug. 26, 1976

[30] Foreign Application Priority Data

Sep. 3, 1975   Italy ............................... 69197 A/75

[51] Int. Cl.² ............................................. B23P 19/04
[52] U.S. Cl. ..................................... 364/468; 29/711; 29/712
[58] Field of Search ....................... 235/151.1, 151.11; 29/709, 711, 712, 407, 406

[56] References Cited

U.S. PATENT DOCUMENTS

| | | | |
|---|---|---|---|
| 3,171,327 | 3/1965 | Williamson | 29/26 |
| 3,654,616 | 4/1972 | Dunne et al. | 235/151.11 |
| 3,709,623 | 1/1973 | Stephan et al. | 29/26 |
| 3,758,835 | 9/1973 | Rose | 235/151.11 X |
| 3,824,674 | 7/1974 | Inoyama et al. | 29/407 |
| 3,885,295 | 5/1975 | Engelberger et al. | 29/208 C |
| 3,891,910 | 6/1975 | Kumagai et al. | 235/151.11 X |
| 3,893,217 | 7/1975 | Edmond | 29/407 |
| 3,920,972 | 11/1975 | Dudley et al. | 235/151.11 |

*Primary Examiner*—Eugene G. Botz
*Attorney, Agent, or Firm*—Schuyler, Birch, Swindler, McKie & Beckett

[57] ABSTRACT

An autoadaptive working center for programmable automation comprises sensing means adapted to recognize a set of different situations of the working process, and program means for storing a program constituted by a set of subroutines corresponding to the said situations. The said sensing means are adapted to address, in response to the recognition of a given situation of the working process, the corresponding subroutine of the program. The working center comprises at least a pair of autoadaptive operating devices programmable separately and controllable by separate control units, under coordination made by a central unit as a function of the duration of the respective operations, the working positions of the various tools and the overall dimensions of the said heads. Each operating head is movable along at least two coordinates by numerical control units, each unit commanding a corresponding stepping motor. The working center includes a recording unit for recording a set of instructions corresponding to a set of operations of the working center which are manually controlled by the operator.

4 Claims, 13 Drawing Figures

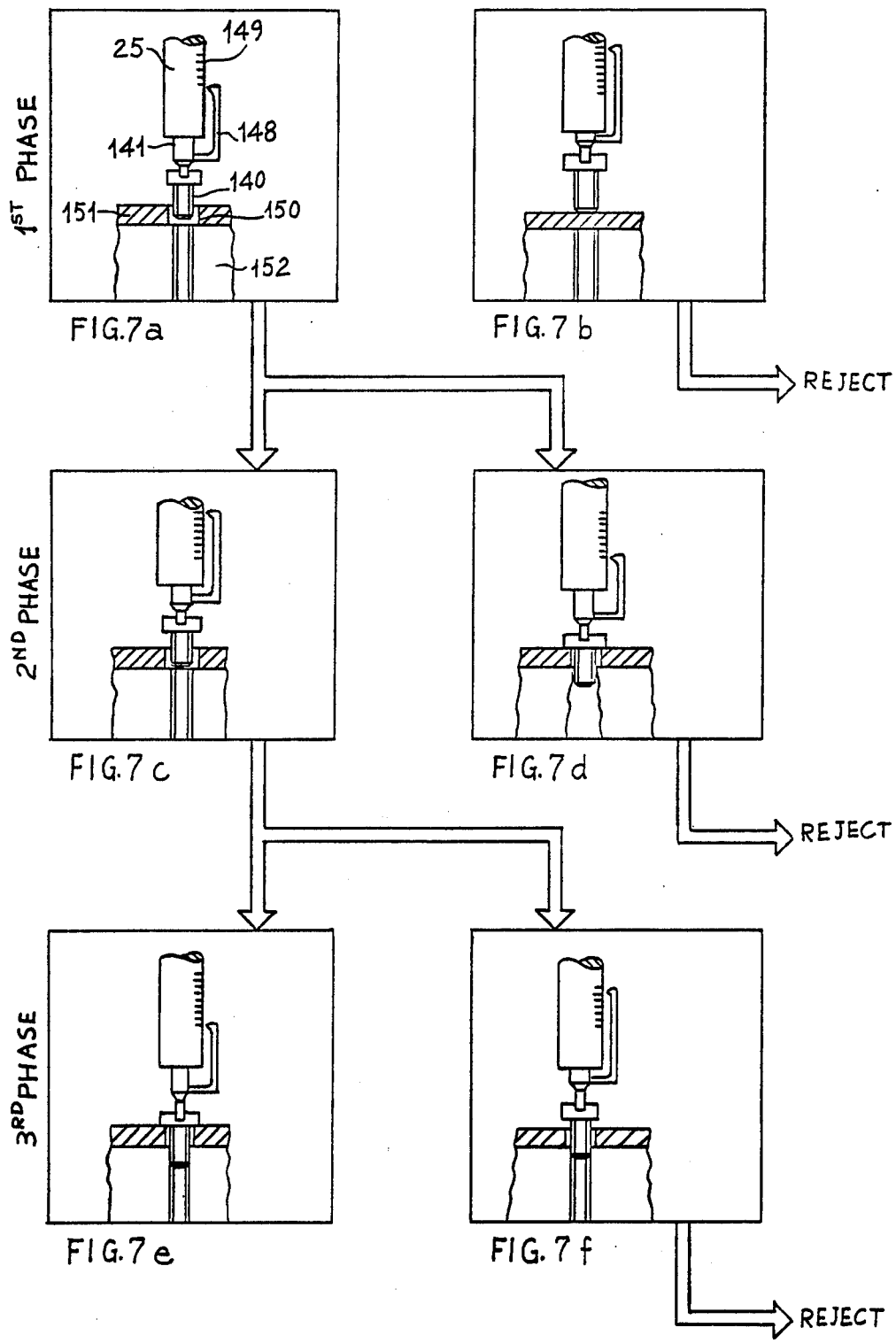

4,092,719

AUTOADAPTIVE WORKING CENTER FOR PROGRAMMABLE AUTOMATION

BACKGROUND OF THE INVENTION

The present invention relates to a working centre which is autoadaptive under programmable automation.

In very high precision working centres, the relative movement between the workpiece or part to be worked and a given operating head is commanded by numerical control by means of very costly equipment which ensures very high precision. These working centres operate satisfactorily with operating heads equipped with tools, for example, for drilling, but cannot be adapted for fitting or assembly operating heads, in which a certain position of the workpiece which cannot be determined exactly beforehand because of tolerances of preceding machining operations or play in already fitted kinematic trains must be reached precisely, for example for interconnecting two mechanical parts.

Equipment is known in the art which is proposed which are capable of bringing a particular tool over a given position of a workpiece with a certain approximation and of subsequently sensing the workpiece itself in accordance with a predetermined law until it is arrested exactly in the desired position. In another known machine there has also been proposed an autoadaptive tactile device in which the toolholder is provided with sensors which, as a function of the displacement, for example of a pin with respect to a hole, produce a corresponding displacement of the toolholder by means of servomotors. Both these known machines require very sophisticated and costly electronic apparatus for the command of the part. They moreover have the disadvantage of acting as if mechanically rigid, so that failure of the electronic control to operate may damage the machine.

The object of the present invention is to provide an autoadaptive working centre which does not require any apparatus for controlling the movement after the approximate positioning of the part and which lends itself both to positioning a working tool and to positioning a fitting or assembly tool.

SUMMARY OF THE INVENTION

According to the present invention there is provided a working centre which is autoadaptive under programmable automation, comprising sensing means adapted to recognize a set of different situations of a working process, program means storing a program including a set of subroutines corresponding to the said situations, the sensing means being arranged to address, in response to the recognition of a given situation of the working process, the corresponding subroutine of the program.

BRIEF DESCRIPTION OF THE DRAWINGS

The invention will be described in more detail, by way of example, with reference to the accompanying drawings, wherein:

FIGS. 7a–7f show diagrammatically a series of stages of the work carried out by the variant of FIG. 6.

DESCRIPTION OF THE PREFERRED EMBODIMENT

Working Centre

The working centre may be briefly described as a system equipped with two operating heads, each with three degrees of freedom, translations X, Y, Z, which are controlled by a single control unit composed of specific electronic hardware, and by a minicomputer.

Figure 1:
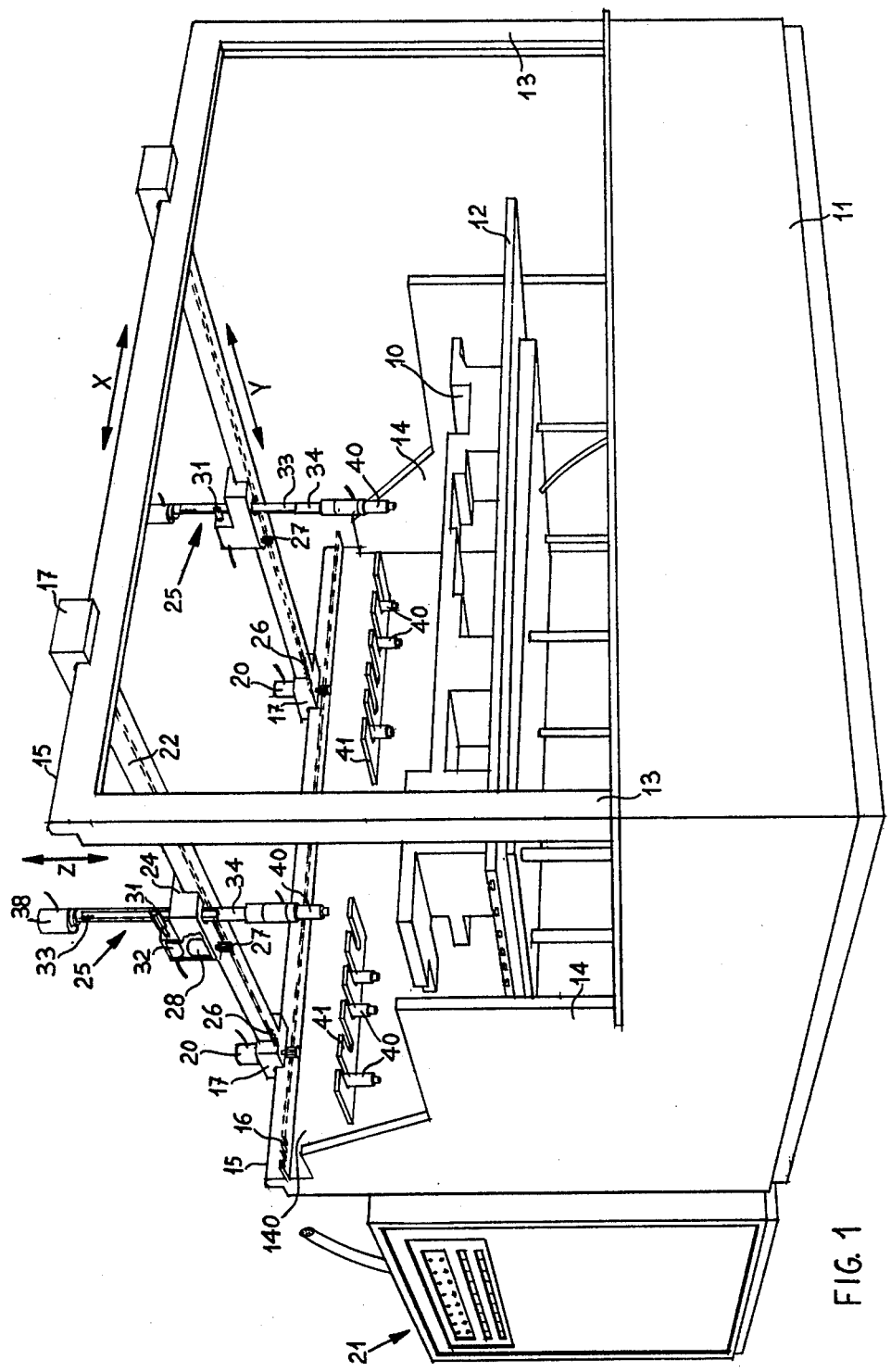
FIG. 1 is a diagrammatic perspective view of a working centre embodying the invention.
Figure 5:
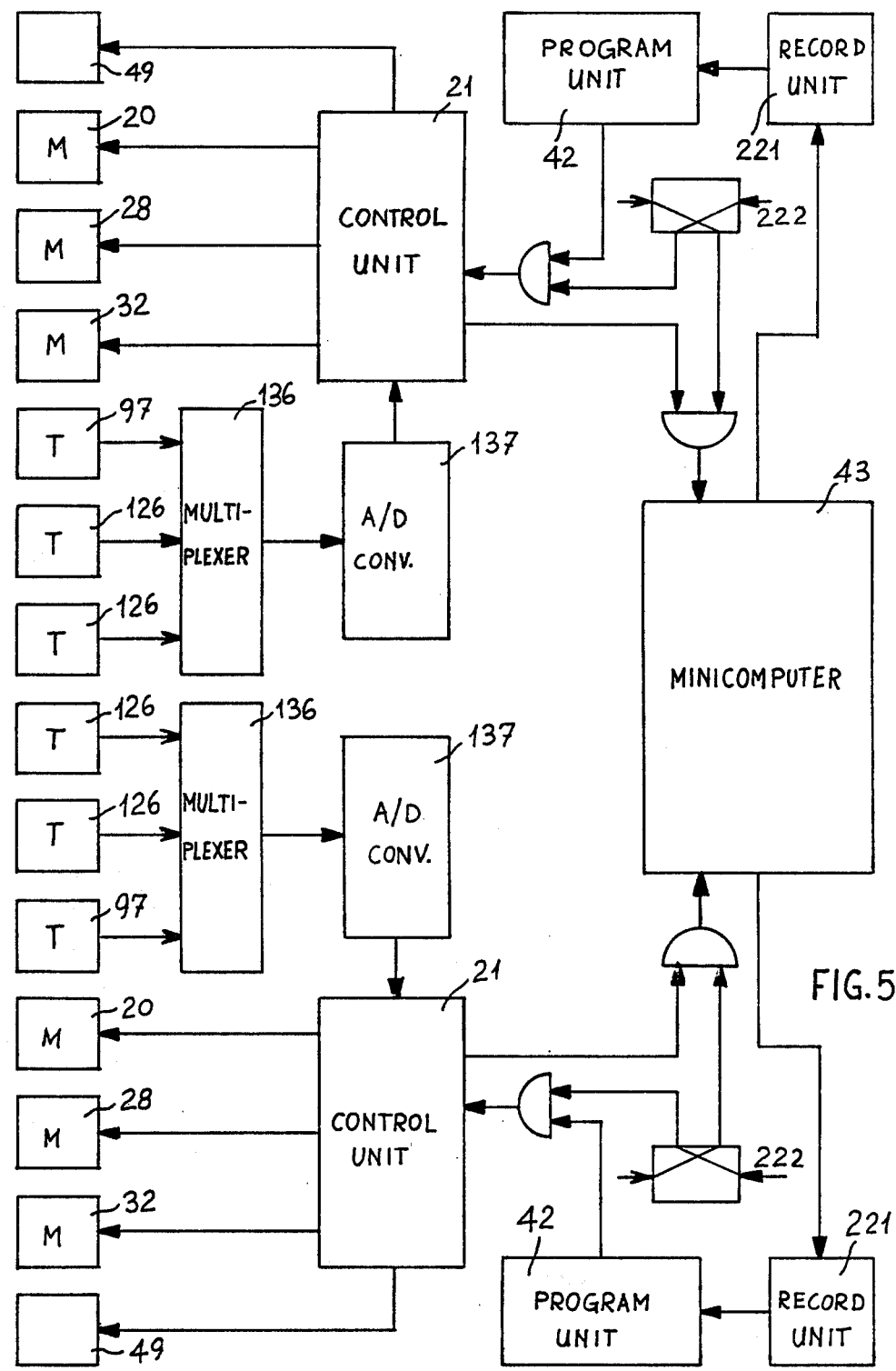
FIG. 5 is a diagram of the control system of the working centre of FIG. 1.

Referring to FIG. 1, the bed 11 of a working centre is provided with a fixed worktable 12 on which a workpiece or part 10 to be worked is fixed. To the bed 11 there are fixed two front uprights 13 interconnected by a crosspiece or rail 15. Towards the rear, side walls 14 stand up from the bed and are spanned by a back wall 140 on top of which is another rail 15. The rear rail 15 bears a fixed rack 16. The rails 15 are spanned by two fore-and-aft beams 22 whose ends are in the form of carriages 17 running along the two rails 15, each of the rear carriages comprising a pinion in engagement with the fixed rack 16 and adapted to be rotated by a stepping motor 20. This is commanded, by means of a number of pulses proportional to the movement that the carriage must make along the axis X, by a corresponding control unit 21 (FIG. 5) provided with an internal memory and known per se, for which reason it will not be explained in detail. For example, for each stepping motor to be controlled, this control unit 21 includes a control circuit of the type described in commonly assigned U.S. Pat. No. 3,846,680. According to the present invention, the registers which store the predetermined number of steps for the stepping motors in the above patent are loaded by the program unit 42. Thus, the control circuit of the type disclosed in the above patent is compatible with the present invention.

Working heads 25 have carriages 24 which can run in the Y axis direction along the beams 22. Each carriage 24 is moreover provided with a pinion 27 which meshes with a rack 26 fixed to the beam 22 and is driven by a second stepping motor 28 controlled by the unit 21 (FIG. 5) for the movement of the working head 25 along the axis Y.

The carriage 24 is provided with a third pinion 31 (FIG. 2) rotated by a third stepping motor 32 which is also controlled by the unit 21. The pinion 31 meshes with a rack 33 formed on a barrel 34 of the working head 25 for the movement of the head along the axis Z. A toolholder 40 is connected removably to the barrel 34.

All the movements are obtained using ball bearings which slide on ground guides and play is taken up and alignment established by means of eccentrics not shown in the drawing. Drives are effected with the stepping motors and racks and pinions. A reduction gear is inserted between each motor and its pinion: to each step of the motor there corresponds an advance of 0.05 mm, which therefore represents the maximum resolution of the system. In order to ensure maximum modularity, all the drives are independent and identical to one another;

more particularly, motors, reduction gears and pinions are the same for all the axes.

The changing of the toolholder 40 according to the working operations to be carried out is effected automatically. To this end, on the back wall 140 (FIG. 1) there is mounted a tool rack 41 for each head, in which the various toolholders 40 to be used are arranged in predetermined positions. A program unit 42 (FIG. 5) is adapted to provide each unit 21 with the information required by the stepping motors 20, 28 and 32 to allow the head 25 to set down the tool which has worked in the respective position, search for the new tool, take up the new tool from the rack 41 and position the head 25 in the required position with respect to the workpiece 10. The program unit 42, for example, may comprise an external memory such as a magnetic tape or disc for storing data and instructions for use in controlling the operation of the stepping motors 20, 28 and 32. In addition, the program unit 42 includes a conventional reading circuit for reading the data and instructions from the memory.

The working centre described is for use in applications which require point-to-point control, in which the precision required is relative only at the final point of each path. The programming of the machine with numerical control provides for the drawing-up and storage on a data carrier of the list of instructions to be given to the machine, if need be with the possibility of editing procedures which allow some data to be modified if the results of the working do not correspond to the theories of the programmer.

More particularly, the programming requires the following features: storage of data and instructions, reading of the stored data in sequence, execution of computations for effecting, for example, linear or circular interpolations, visual display, printing of data relating to the progress of the work, and conversations with high-powered electronic data processing equipment for solving emergency situations.

So that the system may present great generality and be rapidly convertible from one type of application to another, the system comprises a data processor, for example a minicomputer 43 to be specialized with appropriate software, for handling the control units 21. The structure of the mini computer 43 is conventional in the art. For example, the structure of the mini computer 43 as well as the program unit 42 described above is set forth in further detail in U.S. Pat. No. 3,725,651. Referring to the above patent, the mini computer 43 is essentially equivalent to the program controller 34 and the program unit 42 is equivalent to the tape reader 32 which is connected to the program controller 34 with the exception that the program unit 42 in the present invention is a magnetic tape reader rather than a punch reader. As further described below, the mini computer 43 in the present invention is also capable of generating the programs. As shown below in FIG. 5, the connections between the mini computer 43 and the program units 42 which control the associated control units 21 have been omitted for the purpose of graphic simplicity.

The program, in turn, is constructed in a modular manner, in which the individual modules are constituted by subroutines relating to fixed cycles to be effected a plurality of times. The subroutines are distinguished by specific addresses and can be called by the minicomputer 43 in an independent manner, or by means of conditional jumps provided in the program directly from the unit 42.

A method of instruction of this kind presupposes on the one hand that the machine has an absolute level of precision such as to comply with the instructions themselves and on the other hand that the parts to be handled have, in addition to good repeatability, also an absolute precision of the same order as that of the machine and of the control system. In reality, it may happen, especially in assembly operations, that the superposing of many parts leads to final positions with degrees of precision considerably lower than those of the individual components.

A second aspect to be borne in mind is that in long and complex handling or manipulating operations (composed of hundreds of elementary movements) theoretical programming carried out in the abstract certainly appears very difficult and may be the source of many errors. Theoretical programming would therefore require a high precision even in the allocation of the fixtures on the machine.

In order to obviate these disadvantages, the working centre comprises, in respect of each head, a normally inactive recording unit 221 which can be conditioned by the minicomputer 43 to record a set of instructions in the program unit 42. The structure of the recording unit 221 is conventional in the art. For example, the recording unit 221 includes a magnetic recording head and the relevant control circuit for the magnetic recording head which is controlled by the mini computer 43 upon calculation of data as described below. A manual control unit including a flip-flop 222 is moreover adapted to exclude the control of the unit 21 for the working centre. The last-mentioned, in turn, has the ability to be guided manually in the execution of the first working cycle by a series of elements not shown in the drawings which produce in known manner the sequence of movements required by the cycle. These movements, associated with the stepping motors 20, 28 and 32, generate through a series of transducers not shown in the drawings, signals which are transmitted through the medium of the control unit 21 and under the command of the unit 222 to the minicomputer 43, generating in turn the corresponding instructions. These are sent to the unit 221, which produces the recording thereof in the unit 42, for example in a memory of the latter, thus storing little by little the instructions which reflect the actual situation of the absolute precision of the machine, the fixtures and the parts to be handled.

The data stored in this way will naturally allow the machine to repeat a large number of cycles which are all alike at will.

The working centre operates in a flexible manner, that is it has a non-deterministic behaviour in accordance with which it has the ability not to follow rigidly the instructions stored in the unit 42, but to engage rescue or preservation procedures if the actual situation does not reflect that provided for in the programming stage. For example, if the elementary operation in an assembly or fitting cycle consists in inserting a pin in a hole, the actual situation may present the following abnormalities: absence of the pin, absence of the hole, diameters of the pin and the hole such as not to permit fitting, relative positions of the axis of the hole and of that of the pin such as not to permit the operation of insertion.

In a deterministic system, the cycle would continue even in the presence of abnormalities, so that the attainment of the objective and the reliability of the method are a function of the quality of the parts that are put in, the success of the preceding operations and the capacity of the machine for repetition. The use of specific safety devices generally has the aim of stopping the work, leaving to the operator the care of discovering the causes of the stoppage and, if possible, of making the due corrections in the initiated cycle.

A system which needs to be general and which is suitable also for working on batches must be able to detect in a general way any abnormalities which might arise. It is therefore necessary to provide a system which analyzes the situation in a general way from time to time and emits universal signals which are simple to interpret.

To this end, the working centre comprises sensing means constituted by a series of position and/or force transducers adapted to recognize in a tactile manner a series or set of different situations of the working process. A number of these transducers will be seen hereinafter in the description of the working head of FIGS. 3 and 4. Moreover, there is obtained in this case an unambiguous meaning of the signals and a simple treatment for the interpretation thereof.

For each abnormal situation detected and, therefore, for each signal which interprets it there is provided during the formulation of the program a set of corresponding subroutines, which thus constitute the rescue procedures for overcoming unforeseen difficulties. These procedures are stored and are used, when the need therefor arises, by means of addressing, through the minicomputer 43, produced by the signals emitted by the transducers.

The possibility of employing the signals of the transducers for modifying the programmed behaviour of the machine allows for overcoming the difficulties deriving from coarse discrimination of the control system and of the drives even in cases in which there is a low repeatability of the machine and of the parts.

Since the two operating heads 25 have a certain bulk and the working operations required have a variable duration, it may happen that, by programming the two operating heads separately and causing them to work at the same time, two working operations of the two heads 25 must be effected simultaneously in positions very close to one another. In this case, it would be necessary to provide two programmings coordinated in such manner as to eliminate this eventuality by delaying one working operation with respect to the other.

However, this eventuality is eliminated by causing the two program units 42 to be coordinated through the minicomputer 43 programmed in such manner as to arrest one of the two operating heads 25 if the path thereof interferes with the path of the other operating head 25.

The working centre described here is particularly suitable for operating in the fields of precision mechanics, light electromechanics and electronics. Since not necessarily all the characteristics enumerated are indispensable in each application, the system presents a high modularity for obtaining the necessary operations to suit different applications at minimum cost.

From what has been stated hereinbefore it is clear that the system presents the following characteristics:
programmability
autoperception
non-deterministic behaviour.

The system moreover presents the following characteristics:
modular kinematics and drives
high-performance dynamics
re-equipability or re-toolability.

In the case described, two operating heads are provided, each having three orthogonal degrees of freedom. Possible rotary movements, if necessary, are achieved with a double system rotatable in the plane of the machine.

An arrangement of this kind has the following advantages:
good precision, which is constant at all points of the working area,
smaller moving masses and, therefore, smaller inertia forces,
greater simplicity in the execution of rectilinear paths, which are very common, especially in assembly or fitting operations,
maximum modularity and, therefore, the possibility of giving the machine a configuration in accordance with minimum performances required, but leaving the way open to higher levels of sophistication which might become necessary at subsequent times.

A characteristic of a centre for working by programmable automation is that of executing the various operations (movements) in a time sequence. It is therefore obvious that the performance and the productivity of the machine will be a function of the rapidity of the movements. The rapidity, of course, is in turn a function of the maximum speed and of the accelerations which the actuating system can provide. In the working centre described, a satisfactory rapidity has been obtained without sacrificing the high degrees of precision of positioning which are required by many working operations.

When the precision of a machine is mentioned, it is still necessary to distinguish between absolute precision and repeatability. The first is a function of the geometry of the machine, the plays and the flexibility of the various parts. The second depends exclusively on the discrimination of the actuators and of the control system.

One of the most important advantages of the system is its reequipability. In fact, the most probable use of a programmable automation system is for the production of batches.

Only by chance, in fact, will it happen that the productivity of the system is completely saturated by the instantaneous demand. Moreover, in this case, in order to cope with prolonged stoppages, it is appropriate to reserve the possibility of using the specific equipment on a system which, because of its generality, can constitute a standby for a plurality of machines which are used in a practical set-up.

In order to cope with these requirements, it is necessary for the equipment to be interchangeable and quickly replaceable. By equipment there is meant here both the positioning and feed devices (which are normally fixed) and the more or less general gripping elements or tools for specific technologies (fitted at the ends of the movable arms), and the basic software and the program data.

As will be seen hereinafter, the re-equipability is rendered easier here by the modularity of the programs, the gripping equipment and the toolholders provided for automatic changing during the working process.

The subdivision of the tasks between the specific hardware and the minicomputer is effected in attempting to obtain the minimum total cost and to simplify extensions or reductions of the system. In particular, from what has been seen hereinbefore, it is clear that the units 21 parallelize the power supplies with specific hardware modules which are alike and serialize, within the minicomputer, all the functions of control, storage, etc.

The specific electronic hardware therefore has the dual function of multiplexing the input/output signals of the computer and of providing the power levels necessary for the drives.

Moreover, all the movement functions of the axes are completely controlled in the hardware: setting in motion, acceleration, control of speed, slowing down and stopping are controlled by specific circuits. Each of the motors 20, 28, 32 is provided with circuits for controlling the sequence (stepping advance), controlling the current (chopper circuit) and for supply which are independent and alike, so that the servicing of the system is therefore greatly facilitated. The specific electronic hardware also forms the interface towards the minicomputer 43 for the extra travel microswitches, the safety devices and the console.

The conversation between the hardware and the minicomputer is carried out with redundancies so as to reveal failures, errors or disturbances.

The console is very simple. The presence of a teleprinter, in the instruction stage only, enables the number of push buttons to be greatly reduced in fact. The running of the machine in production therefore proves remarkably simple.

The main functions performed by the minicomputer 43 are:

encoding the instructions supplied by man in a high-level language during the instruction stage;

storing the instructions themselves in the central memory of the system (with the elimination, therefore, of punched tapes or other external memories);

sequencing and distributing the instructions themselves to the specific hardware at the appropriate times and in the special machine oriented form required by the electronics of the system.

The program is subdivided into various modules which are independent of one another and which make use of a common "given base" containing, in addition to the stored program, the conditions which define the "state" of the system (coordinates of the axes, state of the auxiliaries, operations started, state of the hardware, methods of data exchange, etc.).

The main modules of the program are:

a supervisory module for start and restart of the program and for selecting the operative conditions of the system: it enables the individual modules to be called through the medium of a kind of "job control language";

a memory subdividing module: for prearranging the central memory for the storage of specific data;

an instruction module for the programming in accordance with the principle of the "record play back mode", that is the so-called "auto-instruction". The system is guided the first time by man to execute the desired path, which is stored. In this stage all the complementary information necessary for operation is also introduced through the medium of a teleprinter; the basic set of instructions of the system is given in the following Table together with the instructions added for the principal derived machines;

an execution module for executing one or more cycles in a partial or complete manner, continuously or step-by-step, according to the instructions supplied by the operator;

an editing module for the partial correction of the instructions already stored;

a rescue and reloading module for obtaining a copy of the data stored and reloading it into memory: this module enables batch working with reduced re-equipping times to be performed without the need to reprogram the operations each time.

The modularity of the software enables various programs to be tailored exactly to the requirements of individual machines without modifying the basic modules and, above all, without changing the conditions and the language of the conversation between man and machine and of the conversation with the electronic hardware.

| INSTRUCTION SET TABLE | |
|---|---|
| MNEMONIC ABBREVIATION | INSTRUCTIONS |
| IN | Learn |
| LI | List |
| ED | Edit |
| MA | Execution of 1 cycle |
| AU | Execution of 1 cycle with console |
| DU | Dump |
| ST | Store |
| FI | End |
| NW | Zeroize axes |
| OK | Confirm initial position |
| FR | Speed of advance |
| SP | Spindle |
| MN | Spindle rotation command |
| AX | Auxiliary |
| OR | Return to beginning |
| KO | Linking |
| NU | Label |
| II | Incremental beginning |
| IF | Incremental end |
| MO | Movement of axes |
| WA | Locking of 1 arm |
| CF | Drilling cycle |
| CM | Tapping cycle |
| TR | Rotary table |
| PP | Presence of external sign |
| EX | Call |
| RP | Search for wall |
| RF | Search for hole |
| AB | Overrunning of end of stroke |
| JU | Jump |
| AS | Printing of absolute coordinates |
| NE | Non-execution |
| RE | Resumption of execution |
| CO | Console |
| FI | End |
| IL | Linear interpolator |
| IC | Circular interpolator |

Autoadaptive Device for Drilling Units

The working centre comprises two working heads 25 for drilling. In each of these, a shaft 36 (FIG. 2) is rotatable in the barrel 34 and is connected by means of a gearbox 37 to an electric motor 38 for rotating a tool 39 carried by a toolholder 40. The tool 39 is adapted to co-operate with a series of bushings 75 having a lead-in or countersink which are prearranged in a drilling jig 175 for indicating the positions of the workpiece or part 10 in which the drillings are to be effected.

The toolholder 40 (FIG. 2) is connected to the working head 25 by means of a coupling 45, which is adapted to adopt a first state for allowing a certain shifting of the toolholder 40 with respect to the head 25 and a second state for clamping the toolholder 40 rigidly to the head 25. The coupling 45 comprises a first member constituted by a sleeve 46 fixed to the barrel 34. The sleeve 46 carries at the bottom a bronze ring 47 which has a plane bearing surface 48 for a second member of the coupling 45 constituted by a disc 52 of the toolholder 40.

In the sleeve 46 there is moreover arranged an electromagnet 49 having a winding 50 adapted to be energized, under the control of the respective unit 21 (FIG. 5), with two different voltages: a first voltage of 8 volts and a second voltage of 24 volts. The electromagnet 49 has an air gap between two parts, one of which constitutes the core 51 of the winding 50, while the other is constituted by the disc 52 of the toolholder 40.

The disc 52 is provided with two holes 53 adapted to engage two axial pins 54 fixed to the ring 47 of the electromagnet 49 in axial and diametrically opposite positions. The holes 53 have a diameter larger than that of the pins 54 and such as to permit a certain movement of the toolholder 40 with respect to the sleeve 46.

The toolholder 40 is moreover provided with a stub or tang 56 rotatable together with the tool 39 and adapted to engage with the spindle of the head 25. This spindle comprises a sleeve 57 which is provided at the top with two like helical slots 58 disposed at 180° one from the other.

Two radial pins 59 carried by a gudgeon 60 connected to the shaft 36 through the medium of a universal joint 61 engage in the slots 58. Between the sleeve 57 and the gudgeon 60 there is disposed a compression spring 62 which normally holds the sleeve 57 in a low position, as indicated in the drawing.

The stub 56 of the toolholder 40 is provided with two radial pins 63 adapted to engage in two slots 64 of the sleeve 57 to carry the tool 39 along in rotation. A series of balls 66 held by a resilient ring 67 serve to retain the toolholder 40 axially in the absence of energization of the electromagnet 49.

In the sleeve 46 there is moreover formed an annular duct 68 which is supplied with compressed air through a flexible tube 69. The duct 68 is in communication by means of a series of axial ducts 71, only one of which can be seen in FIG. 2, with as many nozzles 72 formed in the bronze ring 47, so as to form an air bearing between the surface 48 of the ring 47 and the corresponding surface of the disc 52.

Finally, in the ring 47 there is disposed a sensor 73 adapted to signal the presence of the toolholder 40 and stop both the supply of air and the energization of the electromagnet 49 until the toolholder 40 is connected to the head 25.

The autoadaptive device of FIG. 2 operates in the following manner. When the operating head 25 is brought into correspondence with the new tool 40 on the rack 41 (FIG. 1), while, as has already been said, the toolholder 40 is already oriented so that the holes 53 are in correspondence with the axial pins 54, (FIG. 2), the sleeve 57 may be located in any angular position with respect to the stub 56. If the pins 63 do not engage the slots 64, the sleeve 57 is pushed upwardly in opposition to the action of the spring 62. The helical slots 58 cooperating with the pins 59 then cause the sleeve 57 to rotate until the slots 64 are aligned with the pins 63. The spring 62 then causes the sleeve 57 to jump downwardly and overcome the force of the resilient ring 67 and reach the position of FIG. 2.

The control unit 21 (FIG. 5) now causes the electromagnet 49 to be energized with the voltage of 8 volts and commands the sending of compressed air through the tube 69 into the ducts 68 and 71. The pressure of the air is regulated in such manner that its action through the nozzles 72 on the disc 52 nearly balances the action of the electromagnet 49. In this way, the electromagnet 49 retains the toolholder 40 while allowing it a certain radial movement within the limits permitted by the holes 53, assisted by the air bearing. This movement is also transmitted to the sleeve 57 and to the gudgeon 60, while the shaft 36 is able to remain still owing to the universal joint 61.

With the toolholder 40 connected in this way to the operating head 25, the latter is now shifted under the control of the unit 21 and the apparatus 42 (FIG. 5) until it reaches, with the approximation permitted by the stepping motors 20 and 28, the desired position of the workpiece 10 (FIG. 2), represented by one of the bushings 75 of the jig 175.

The operating head 25 is now moved downwardly by the stepping motor 32 to engage the bushing 75 with the tool 39. If the tool 39 is not exactly aligned with the bushing 75, this engagement causes the shifting of the tool 39 with respect to the shaft 36. As soon as the desired position is reached by the tool 39, the stepping motor 32 stops because the tool 39 cannot advance further. It then sends a signal to the control unit 21, which attends to the energization of the electromagnet 49 with a voltage of 24 volts and to the stopping simultaneously of the supply of air to the tube 69. The toolholder 40 thus remains rigidly fixed to the sleeve 46 and the motor 38 can be actuated for the working operation.

At the end of the work, the operating head 25 is first raised and then moved so as to bring the toolholder 40 back over the rack 41. The electromagnet 49 is now completely deenergized and compressed air is sent to the nozzles 72. The compressed air, no longer balanced by the energization of the electromagnet 49, is now able to overcome the action of the resilient ring 67 on the balls 66, so that the toolholder 40 is detached from the operating head 25, being set down in the corresponding seat in the rack 41 (FIG. 1).

It is therefore clear that a most remarkable feature of this working centre is that of possessing, in combination, two aspects of operation which are traditionally antithetic: the use of a drilling jig and the use of numerical control.

The principal reason for this unusual combination is the technological impossibility of cutting down the drilling times by employing free drills, since in fact that bending of the drills, above all in the case of small holes, limits feed rates. With the presence of the bushings 75, on the other hand, it is possible to reduce the drilling times drastically and eliminate the need for centring. However, the system allows good speeds of positioning, even if with relatively low degrees of precision, which would not permit usable parts to be produced without the use of the jig.

Since the working centre is intended for producing small and medium runs, the cost of the jig has a limited repercussion on the production costs. Moreover, in many cases, the jig is already made for conventional working carried out with rows of sensitive drilling machines, so that the cost of the jig does not represent a true additional cost.

For the purpose of effecting various working operations, in the control of the feed rates of the axes X, Y, Z, in addition to the normal fast rates, the unit 21 is adapted to command a movement along the three axes with eight feed rate values. It is thus possible to execute drilling, tapping, etc. operations with the most suitable feed rate. The workpiece 10 may moreover be mounted on a rotary table not shown in the drawings, thus adding another control axis to the system.

In order to reduce the work of programming, a number of very repetitive typical operations have been "frozen" in the software of the machine, such as a fixed drilling cycle (see instruction CF of the Table); a fixed tapping cycle (instruction CM); an actuation of the rotary tables for changing tools (instruction TR).

Autoadaptive Device for Fitting or Assembly Units

Figure 3:
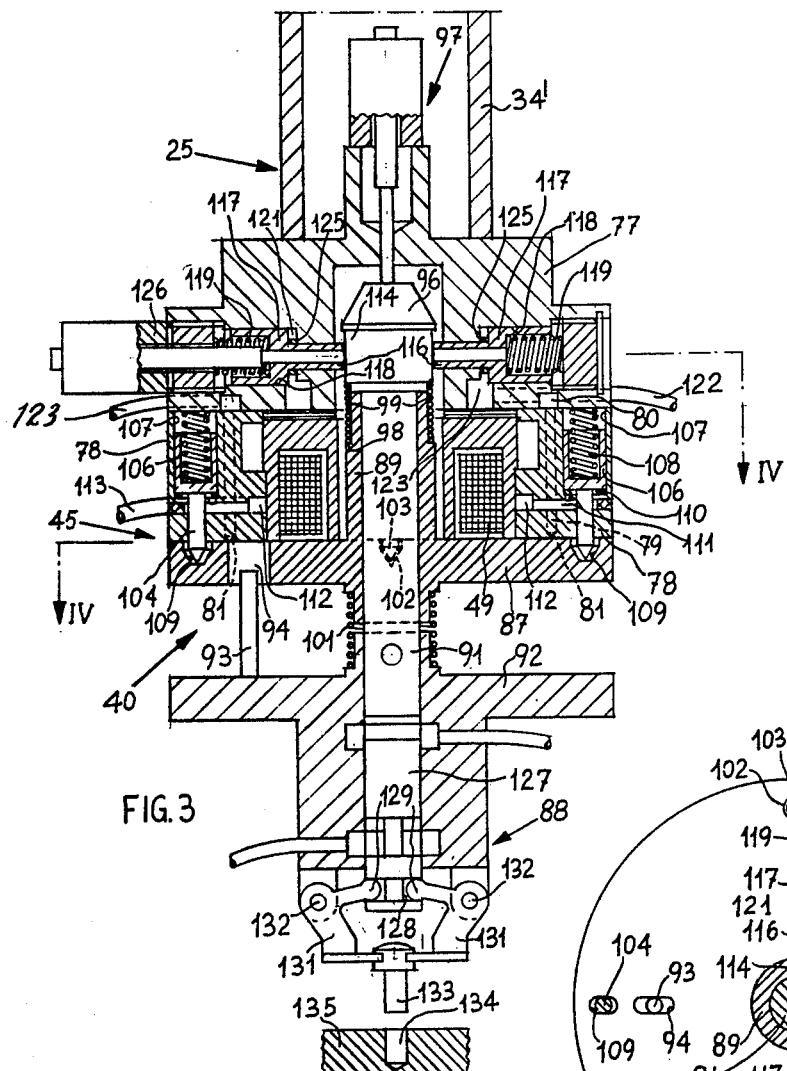
FIG. 3 is a partial median section of a second form of working head.

According to another arrangement the working centre comprises two working heads 25 each adapted to carry a tactile fitting or assembly tool on the toolholder 40 (FIG. 3).

The major difficulties which are encountered in the automation of fitting or assembly operations are the difficulty due to abnormal situations which cause the jamming of the system and the difficulty of executing fitting or assembly which is due to the dimensional tolerances of the parts, since in fitting or assembly, dimensions and tolerances different to the functional dimensions and tolerances of the part come into play. For example, a control lever may be functionally acceptable even if it is markedly bent. In these circumstances, the automatic fitting thereof may prove to be practically impossible.

The system produced is equipped with instruments, hardware and software, capable on the one hand of improving the efficiency of fitting or assembly operations, such as fitting by autocentring with floating and spiral searches, as is better described hereinafter, and on the other hand of detecting, even in this case, the actual and real conditions different from those provided for and of automatically taking simple decisions.

Figures 2, 6:
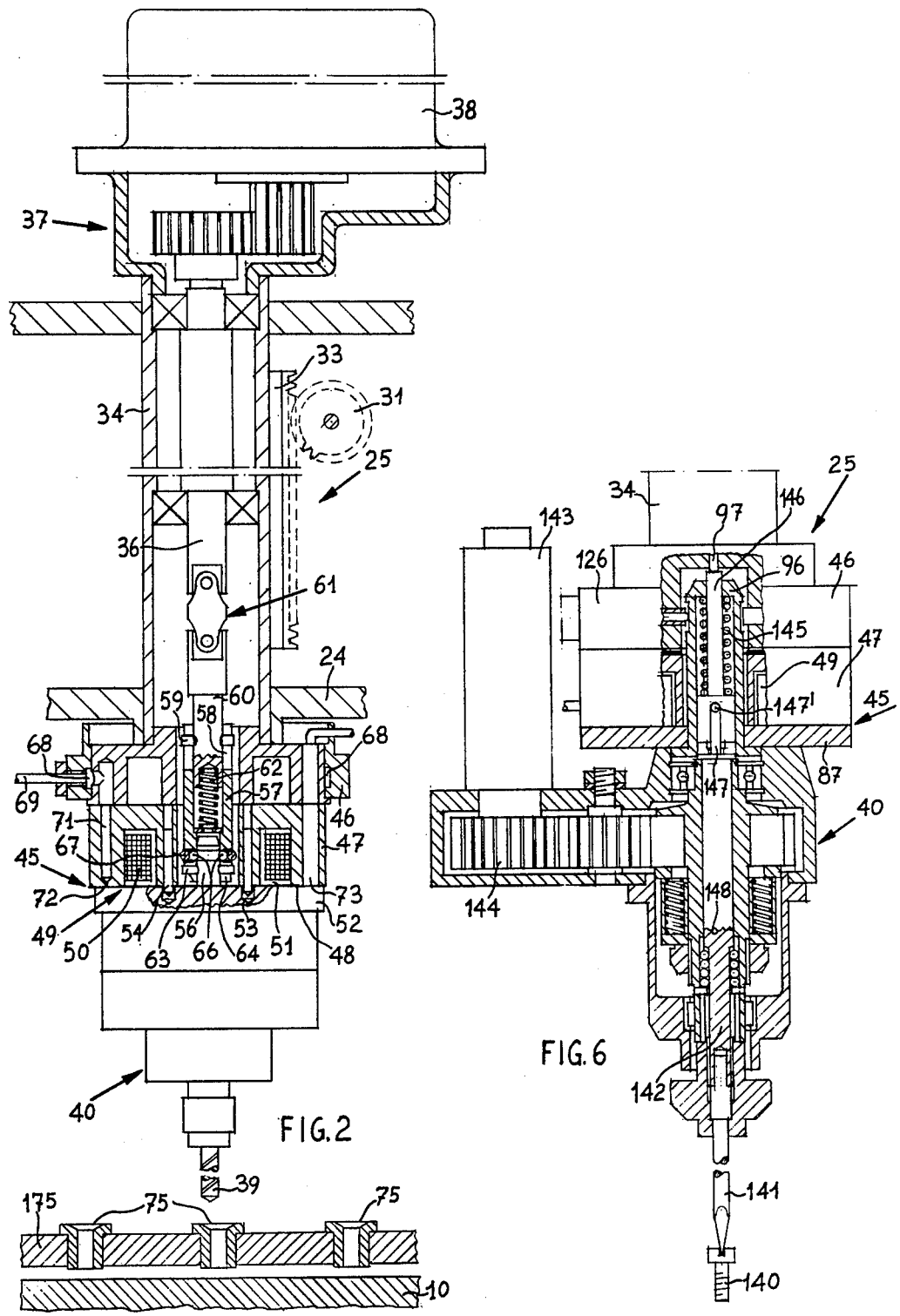
FIG. 2 is a partial median section of a first form of autoadaptive working head.
FIG. 6 is a view, partly in section, of a detail of a variant of the device of FIG. 3.

To this end, the support 24 of the working head 25 carries internally a barrel 34' (FIG. 3) similar to the barrel 34 of FIG. 2. Below the barrel 34' there is fixed a sleeve 77 to which a bronze ring 78 is fixed. In the ring 78 there are formed four axial ducts 79 fed by a circular duct 80 and terminating in a nozzle 81 at the lower surface.

The sleeve 77 carries an electromagnet 49 similar to that of FIG. 2, the magnetic circuit of which comprises a disc 87 included in the toolholder 40. The disc 87 bears a sleeve 89 in which there can slide for a certain stroke a plunger 91 fixed at the bottom to a disc 92 of a tool 88. The disc 92 is rotationally coupled to the disc 87 by means of a pin 93 in engagement with a slot 94 in the disc 87. The plunger 91 is provided at the top with a stub or tang 96 adapted to be sensed at the top by a magnetostrictive transducer 97 for the axis Z, which is adapted to signal in a known manner any axial movement of the stub 96 in different stages of the working cycle.

Between the stub 96 and a shoulder 98 of the sleeve 89 there is disposed a first compression spring 99, while between the disc 92 and the said sleeve 89 there is disposed a second spring 101. The action of the spring 101 prevails over the action of the spring 99, as a result of which the tool 88 normally adopts the high position of FIG. 3.

Figure 4:
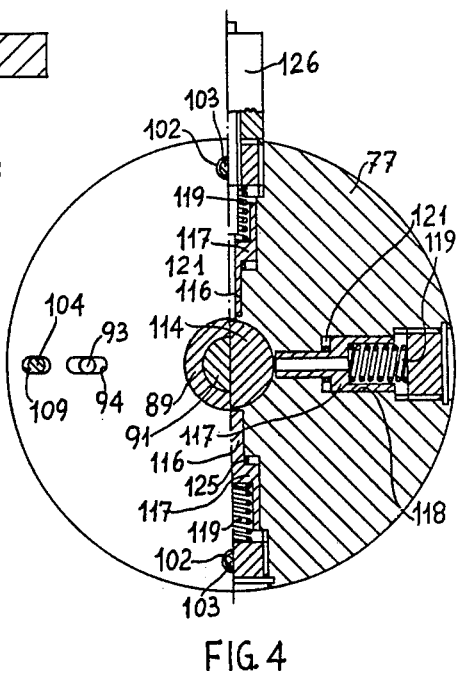
FIG. 4 is a section on the line IV—IV of FIG. 3.

The disc 87 is provided with two diametrically opposite holes 102 (FIG. 4) adapted to engage with a certain play such as to permit the auto-adaptation of the toolholder 40, a pair of fixed pins 103 carried by the ring 78. On the ring 78 there are moreover disposed two resilient pins 104 which are also diametrically opposite and alternate with the pins 103. Each pin 104 is fixed to a piston 106 (FIG. 3) slidable in a cylinder 107 of the ring 78 and biased downwardly by a compression spring 108. The pins 104 are adapted to engage with slots 109 in the disc 87 which are oriented along a single axis, for example the axis X (FIG. 4). The slots 109 are such as not to permit any movement of the disc 87 with respect to the ring 78 along the other axis, so that if the tool carried by the disc 87 must move only along the first axis, the pins 104 are lowered, while in the opposite case the disc 87 can move in any direction within the limits of the play between the pins 103 and the holes 102.

Between the lower face of the piston 106 and the cylinder 107 there is an air chamber 110 fed by means of radial ducts 111 and an annular duct 112 with the air supplied through an external tube 113.

Four hollow centring plungers 116 (FIG. 4) disposed radially at 90° from one another and each integral with a piston 117 slidable in a cylindrical recess 118 can co-operate with a cylindrical surface 114 of the stub 96. A spring 119 biases each piston 117 inwardly, while compressed air can be delivered to an annular chamber 121 through a series of conduits 122, 123. Each piston 117 is normally arrested against a ring 125 (FIG. 3) so as to leave a certain clearance between the end of a centring plunger 116 and the surface 114. The two plungers 116 disposed at 90° from one another in a corresponding manner to the axes X and Y each accommodate a position transducer 126 similar to the transducer 97.

The tool 88 comprises a piston 127 which is movable vertically by pneumatic means and provided at the bottom with a groove 128 which is engaged by two projections 129 of two jaws 131. These jaws are pivoted on two pins 132 of the tool 88 and are adapted to grip a pin 133 to be fitted into a seat 134 in a part 135.

For connection of the transducers 97 and 126 to the respective control units 21 (FIG. 5), the system comprises a multiplexer 136 for each head 25, for selecting the transducer 97, 126 which it is desired to read, and an A/D converter 137 for each head 25 for prearranging the input which the unit 21 must send to the minicomputer 43.

New instructions are moreover provided for permitting easy and general use of the hardware. More particularly, with respect to the instructions of the foregoing Table, the following instructions have been added:

a comparison instruction CFR which enables a comparison to be made between the actual position of the transducers 97, 126 and a predetermined position: in accordance with the outcome of the comparison, the fitting or assembly program may continue in a regular manner in accordance with the stored sequence or may execute a "jump" to other instructions;

a search instruction RIC which enables movements to be caused to be made under force control in all three coordinated planes for making set-down position searches.

The system incorporating the operating head of FIGS. 3 and 4 operates in the following manner:

Let it be assumed in the case of FIGS. 3 and 4 that the tool 88 is movable in the two directions X and Y, so that the slots 109 will not be concerned and, apart from the modularity of the system, could be left out of the disc 87.

Firstly, the program unit 42 (FIG. 5) causes the operating head 25 to be shifted through the control unit 21, bringing the head into correspondence with the toolholder 40 selected in the rack 41 (FIG. 1). The control unit 21 (FIG. 5) now causes compressed air to be sent to the tube 113 (FIG. 3), so that via the ducts 112 and 111 the pins 104 are excluded by overcoming the springs 108. Moreover, the unit 21 now causes the electromagnet 49 (FIG. 3) to be energized with the voltage of 8 volts, connecting the disc 87 to the operating head 25.

The action of the springs 119 on the pistons 117 now produces a first centring of the plunger 91 of the toolholder on the operating head 25. Thereafter, compressed air is sent to the conduits 123 and 122, thus excluding the four plungers 116, and compressed air is sent into the nozzles 81 so as to render the disc 87 easily movable with respect to the head 25, as seen in the case of FIG. 2. Then, through the medium of the unit 21 (FIG. 5), the program unit 42 causes the tool 88 to move to a station, not shown in the drawing, at which is a supply of the pins 133 (FIG. 3). The piston 127 is now actuated, causing it to move upwardly so that the jaws 131 grip the pin 133, as indicated in FIG. 3. Since the pin 133 is unlikely to be in the theoretical position defined by the commands of the program unit 42, on the closing of the jaws 131 the tool 88 shifts with respect to the operating head 25 by causing the disc 87 to float on the ring 78. This action is promoted by the compressed air sent to the nozzles 81 to form an air bearing between the two surfaces of the disc 87 and the ring 78 which are juxtaposed.

At the end of the stroke of the piston 127 the head 25 is moved upwardly and the compressed air is removed from the conduits 123 and 122. Through the medium of the plungers 116, the springs 119 now produce the centring of the plunger 91 together with the disc 87, the tool 88 and the pin 133. The electromagnet 49 is then energized at 24 volts and the compressed air is excluded from the nozzles 81, as a result of which the toolholder 40 remains rigidly connected to the head 25.

The operating head 25 is now brought into correspondence with the seat 134 into which the pin 133 is to be inserted. If the position reached through the command of the unit 21 is not exactly the desired position, there begins a search movement controlled by the three transducers 97 and 126, which are rendered active selectively by the unit 21 through the corresponding multiplexer 136 and send to the minicomputer 43 the corresponding data converted into numerical values by the converter 137. The search movement is commanded by the minicomputer 43 through the instruction RIC and is effected by a spiral motion of the head 25, substantially as described in my U.S. Pat. No. 3,906,325.

More particularly, when the pin 133 touches the part 135 without centring the hole 134, the spring 101 is compressed, so that the stub 96 moves upwardly, causing the transducer 97 to emit a signal which, combined with the height that the tool has reached, produces the corresponding search sequence. The spring 101 could also be compressed in other stages of the cycle, for example because of failure to grip the pin or because of lack of success of the search of the part or because of other obstacles that are encountered. The same signal of the transducer 97 then produces as many different sequences of preservation of the cycle. When the desired position is reached, this being signalled by the transducer 97, the pin 133 is inserted in the seat 134, after which the piston 127 is actuated and causes the jaws 131 to open. If the seat 134 or the pin 133 were to be provided with a chamfer or other suitable lead-in means, the search movement could be eliminated, while the movement of insertion of the pin 133 into the seat 134 is performed with the electromagnet 49 energized at 8 volts and the air bearing established.

When the toolholder 40 is to be replaced on the rack 41 (FIG. 1), the control unit 21 causes the head 25 to move into correspondence with the position of the toolholder, after which the electromagnet 49 is completely deenergized and air is again sent to the nozzles 81, so that the compressed air ensures the release of the toolholder 40 from the head 25.

The working centre lends itself particularly to the fitting or installation of mechanical and electronic parts especially in the office machine and data processing equipment industry, such as the fitting of keyboard levers and printing hammers, the mounting of keys on keyboard levers, the insertion of circuit packages in circuit boards, the stripping of cables and gripping in terminal boards, and the assembly of platen-bearing carriages.

If the part to be fitted is a screw, the toolholder may comprise a screwdriver 141 fixed to a spindle 142 which is rotated by its own electric motor 143 through a gearbox 144. The stub 96 of the toolholder is now hollow to accommodate a spring 145 disposed between the stub itself and a shoulder of a plunger 146 connected by means of two slots 147 to two pins 147' of the spindle 142. This spindle can therefore move with respect to the head 25 owing to the coupling 45, which is similar to that of FIGS. 2 and 3. Moreover, the stub 96 can undergo axial movements with respect to the tip of the screwdriver 141. This movement is detected through the plunger 146 by the transducer 97.

In order to clarify the relative movement of the plunger 146 with respect to the stub 96, the plunger 146 is shown in FIGS. 7a–f as a pointer 148 movable with respect to a scale 149 of the operating head 25.

In the first stage (FIGS. 7a, b), if the head 25, under the control of the unit 21 and possibly by the search movement, brings the screw 140 into correspondence with the hole 150 in the part 151, the spring 145 (FIG. 6) is not compressed and the machine goes on to the following stage. If, on the other hand, the spring is compressed, for example because the hole 150 is not found (FIG. 7b), this fact is signalled by the transducer 97, which produces an unconditional jump in the program and the operation stops (discard).

In the second stage (FIGS. 7c, d), the screwdriver 141 advances, but is not yet turned. If the spring 145 is compressed, all is in order and the machine goes on to the following stage; on the other hand, if the spring is not compressed, this means that the threaded part 152 into which the screw 140 is to be screwed is missing, or the screw 140 is missing, or the thread of the screw or of the part is stripped. In this case, the signal of non-compression of the spring 145 is given by the transducer 97 (FIG. 6) to cause the stopping of the operation (discard).

In the third stage (FIGS. 7e, f), the screwdriver 141 is turned until the screw 140 abuts against the part 151, commanding the stopping of the motor 143 (FIG. 6). If all is in order, the spring 145 is not compressed and the fitting is correct. If, on the other hand, the spring 145 is compressed, this means that the screw has not been screwed home and has therefore not come into abutment against the part 151, so that the operation also stops in this case and the part is discarded.

Figure 8:
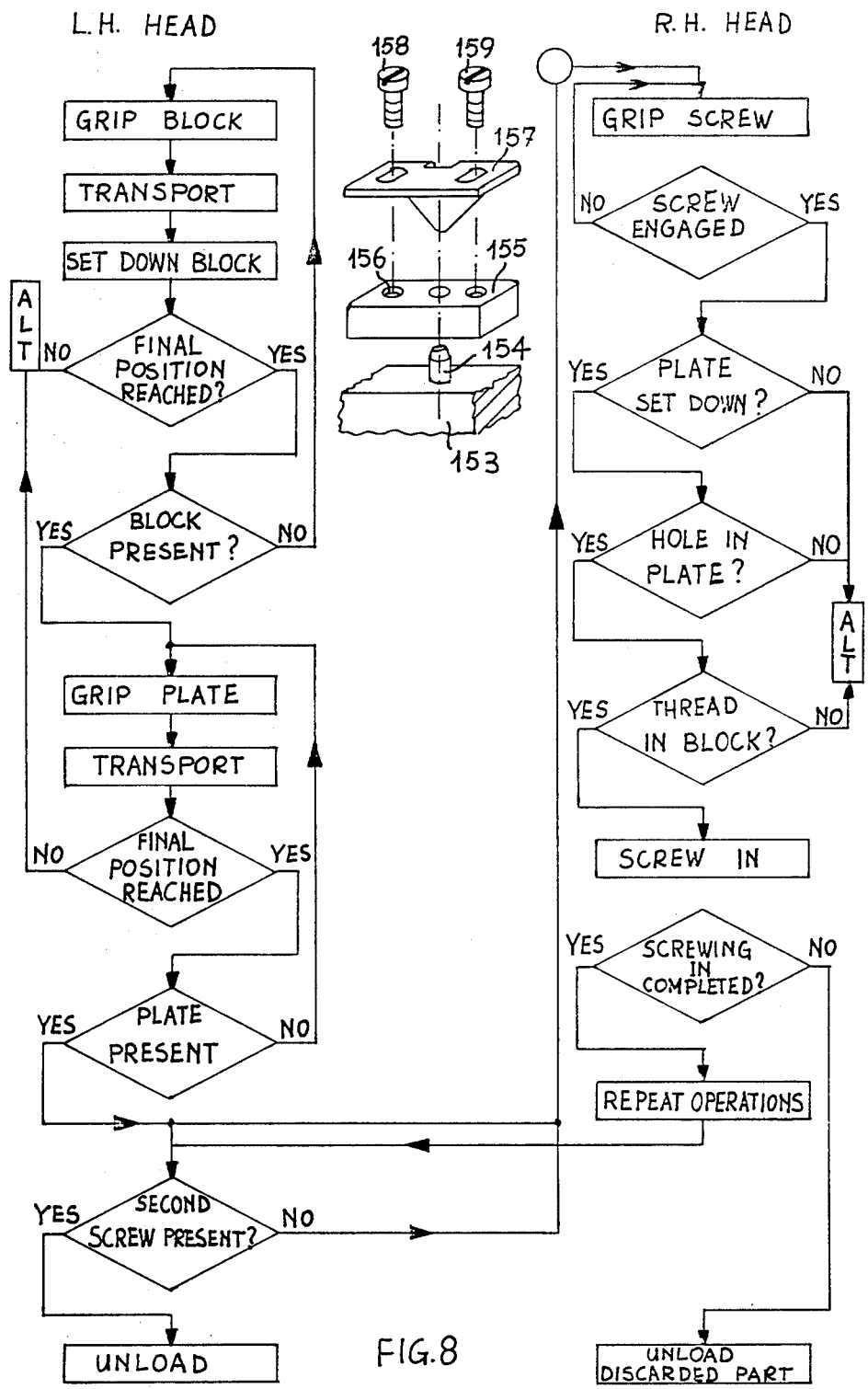
FIG. 8 is a flow diagram of the working stages of a specific assembly operation carried out by the centre of FIG. 1.

FIG. 8 illustrates in the form of a flow diagram the complete sequence for the assembly of a group or unit which requires the use of the two working heads 25.

The operation consists in arranging by means of the left-hand head 25, on a plate 153 which has a locating pin 154, a block 155 having two threaded holes 156 and, on top of this, an angle plate 157. It is necessary to screw two screws 158 and 159 into the angle plate 157 by means of the right-hand head 25. The diagram illustrates clearly all the stages of the operation, indicating the locking between the two heads and the operations to be carried out in cases of interruption of the correct sequence.

The two blocks labelled ALT require repetition of such operations as are necessary to supply a missing block, plate or screw or to replace a defective block or plate.

It is to be noted that the principal and most used assembly sequences may be frozen by storing them as subroutines in suitable memories with a saving of memory occupation and of programming time. The preservation or rescue procedures and alternative procedures for each case of abnormality during an assembly operation may moreover be generated on-line or off-line.

From what has been seen hereinbefore it is clear that the fitting or assembly system described may operate:

in a deterministic manner as a machine with numerical control without any feedback,
with autocentring, that is by profiting by the presence of lead-ins and chamfers which can facilitate the fitting operations,
with special movements of searching for the exact position and detection, through the minicomputer, of the actual state of the system.

The system is capable of:
permitting relative movements also in the three directions X, Y, Z,
detecting these movements and transmitting the detected values to the minicomputer,
bringing the system back into a centred position.

The system may be employed:
as a passive system for executing fitting or assembly operations by profiting by lead-ins and chamfers in a manner entirely similar to that in which the drilling bits 39 are inserted in the bushings 75 (FIG. 2),
as a detector for the heights reached by the pincers, by measuring the relative sliding movements of the barrel 34 and toolholder 40,
as a detector for the forces transmitted through the part to be fitted,
in general as a combination of these three fundamental modes so as to optimize, case by case, the fitting operations and the corresponding checks of correct and complete assembly.

The sensitivity of the system is ensured by the air bearings and by the ground jig bushings 75: thus, it is possible to detect forces of the order of 100 grams and, for example, to recognize the stress due to failure to fix even a single circuit package pin.

The group of procedures and new instructions enables the efficiency of the fitting or assembly operations to be considerably improved inasmuch as the procedures of insertion by autocentring and the search procedures increase the actual number of successful operations, while the possibility of detecting the forces and the true movements allow the minicomputer to follow and check the exact development of the fitting or assembly sequences and, in the event of error or of an abnormal situation, ensures immediate diagnosis and the activation of appropriate rescue procedures.

It is moreover clear that the energization of the electromagnet 49 by means of two different currents always produces in each case two different conditions of the coupling 45, in the first of which the toolholder 40 can undergo a certain shifting with respect to the head 25, while in the second the toolholder 40 is perfectly clamped with respect to the head 25 itself.

It is clear that various modifications, improvements and exchanges of parts may be made in the machining centre described without departing from the scope of the invention as claimed.

The working centre described may moreover be equipped for other types of working operations. One of these operations may be the hot riveting of studs or pins to sheet metal parts. The system reduces the cost of the specific equipment to the minimum and permits good overall efficiency.

The parts to be riveted are carried by a rotary table in order to obtain complete superpositioning of man times and machine times. By employing the same machine with the elimination only of the rotary table, it is also possible to carry out spot welding operations between plane sheets or plates of metal.

The intensity of riveting current (rivet heating current) is regulated by the minicomputer through the medium of a D/A converter forming an interface with the conventional riveting controls, under the control of a special instruction for controlling the intensity of the riveting current and for timing the various stages of the operation. It is thus possible to execute operations with preheating and/or hardening and with approach, riveting, maintenance, tempering, etc. times which are programmable at will.

Another application of the system may be that of cutting sheets or plates with a plasma torch. The dimensional tolerances and the surface finish of the cut part make the system very suitable for preparing sheets for bodies, large sides of reprographic machines, furniture, store get-ups, etc.

The amplitude of cutting is about 2 mm and the system can therefore cut profiles with concave radii of not less than about 3 mm. The need to make profiles requires the addition of numerical control apparatus controlled by a punched tape and comprising the necessary linear and circular interpolators, with the possibility of introducing corrections of radius.

What I claim is:

1. In an autoadaptive working center for programmable automation having at least one operating head for performing work on a workpiece, servomotor means for moving said operating head along a predetermined path in at least two coordinates, a central processing unit comprising a program unit for storing the working center program and a processing unit for executing the working center program, said program unit additionally storing position data for defining the path of said operating head and process data for defining the operations to be performed by said operating head at predetermined points along the path of said operating head, and a control unit responsive to the position and process data in said program unit for controlling the operation of said servomotor means, wherein the improvement comprises:

a plurality of transducers mounted on said operating head for sensing abnormal operating conditions at said operating head different than the operating conditions anticipated by the working center program and generating signals representative of these abnormal operating conditions; and transmitting means connected to said plurality of transducers for transmitting the signals representative of abnormal operating conditions to said central processing unit, wherein said processing unit further comprises addressing means connected to said transmitting means for generating addresses corresponding to the signals representative of abnormal operating conditions, said addressing means being connected to said program unit for addressing rescue subroutines stored in said program unit corresponding to the different abnormal operating conditions to enable said processing unit to execute a rescue operation on said operating head.

2. A working center according to claim 1 wherein said servomotor means comprises a plurality of stepping motors associated with different coordinates for moving said operating head along a predetermined path in response to a number of position pulses supplied by said control unit proportional to the desired movement in each of the different coordinates, said control unit including pulse generating means responsive to the position data provided by said program unit for generating the position pulses.

3. A working center according to claim 2 further comprising:

manual control means connected to said control unit and said stepping motors on said operating head for inactivating said control unit to manually control the movement of said operating head;

signalling means associated with said stepping motors for supplying signals representative of the manual operation of said stepping motors to said processing unit, wherein said processing unit further comprises position data generating means for generating position data from the signals representative of the manual operation of said stepping motors; and a recording unit connected to said processing unit for recording the position data generated by said position data generating means, said recording unit being connected to said program unit for supplying position data to said program unit.

4. A working center according to claim 1 further comprising a plurality of operating heads each controlled by a different control and program units, each of said program units storing position and duration of operation data for each of said operating heads, wherein said processing unit further comprises coordinating means responsive to the position and duration of operation data in said program units for coordinating the operation of said control units.

* * * * *